Jan. 27, 1931.  G. B. YOUNG  1,790,631
COOKING APPARATUS
Filed March 27, 1930
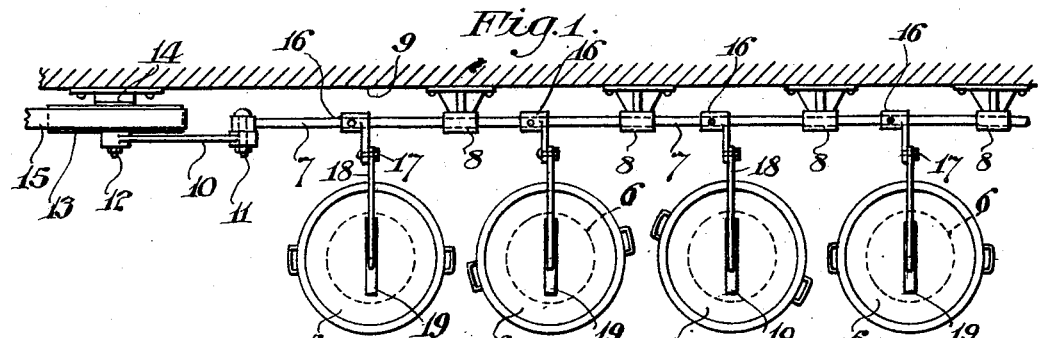
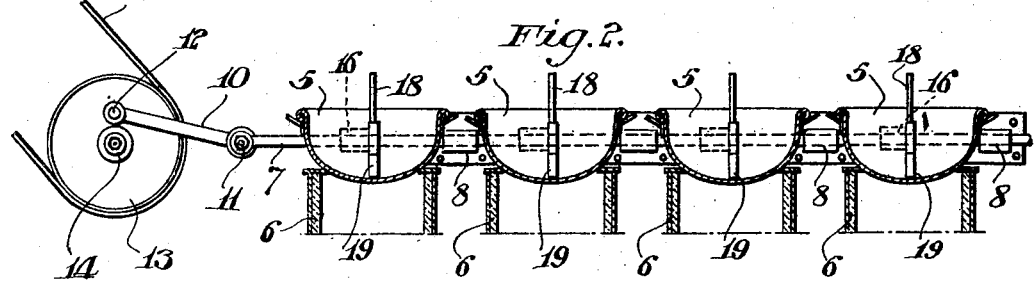
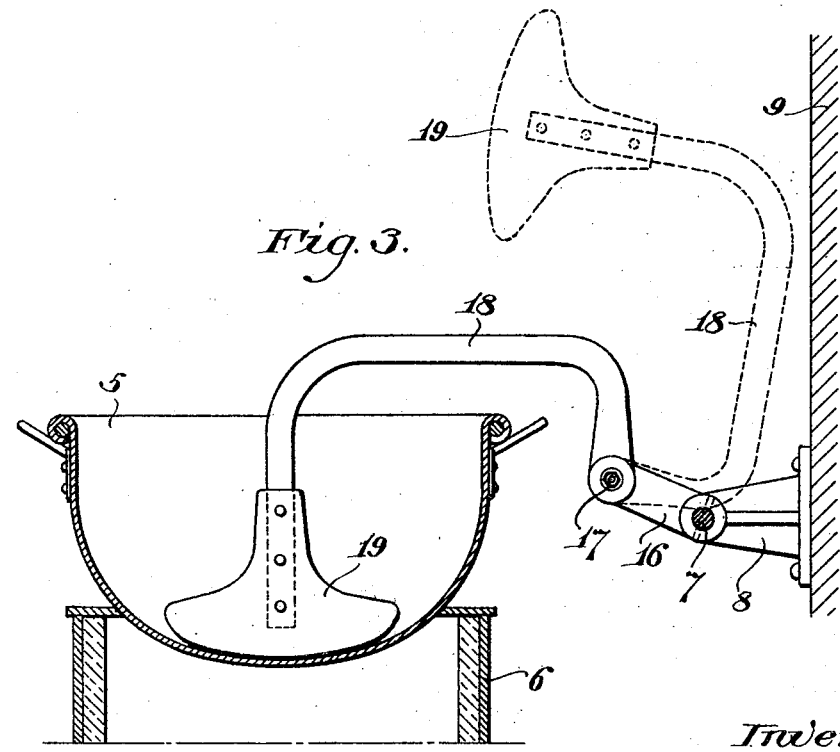
Inventor:
Gavin B. Young,
By Jas. C. Wobensmith
Attorney.

Patented Jan. 27, 1931

1,790,631

UNITED STATES PATENT OFFICE

GAVIN B. YOUNG, OF PHILADELPHIA, PENNSYLVANIA, ASSIGNOR TO YOUNG'S CANDY PRODUCTS CO., INC., OF PHILADELPHIA, PENNSYLVANIA, A CORPORATION OF DELAWARE

COOKING APPARATUS

Application filed March 27, 1930. Serial No. 439,288.

My invention relates to cooking apparatus, and it relates more particularly to improved means for preventing scorching in the cooking of certain materials, such, for example, as candy.

Heretofore, in the cooking of candy and the like, which is ordinarily done in open kettles, it has been found necessary, for the purpose of preventing scorching, to stir the material within the kettles constantly, usually by means of manually actuated paddles. As boys are customarily employed for this work, the materials would often become damaged through inattention, and in any event, the cost of the labor involved was comparatively high.

The principal object, therefore, of my present invention is to provide improved means for stirring the materials being cooked in kettles, which will be simple, efficient, and certain in its action, which may be used with the ordinary cooking kettles at present in use, and which will result in marked economies, not only minimizing the labor required, but also reducing the loss from scorching or burning of the materials through inattention on the part of the operator.

A further object of my invention is to provide such apparatus adapted to be applied to a plurality of kettles, which is so constructed and arranged that it may be rendered inoperative with respect to any one or more of the kettles without interfering with the action with respect to the other kettles.

The nature and characteristic features of my invention will be more readily understood from the following description, taken in connection with the accompanying drawings forming part hereof, in which:

Figure 1 is a top or plan view of a series of candy cooking kettles, with apparatus embodying the main features of my present invention shown associated therewith;

Fig. 2 is a front elevation thereof, partly in section; and

Fig. 3 is an enlarged transverse section of one of the kettles, illustrating in side elevation the apparatus of my invention applied thereto, the stirring device being also shown in inoperative position in dotted lines.

It will, of course, be understood that the drawings and description herein contained are illustrative merely, and that various modifications and changes may be made in the structure disclosed without departing from the spirit of my invention.

Referring to the drawings, in the particular embodiment of my invention therein shown, the cooking kettles 5 are arranged in a row, each kettle being mounted upon an individual stove 6 of any preferred type.

At the rear of the row of kettles 5 a longitudinally reciprocable shaft 7 is mounted. The shaft 7 is slidably supported in brackets 8, which may be secured to any rigid structure, such as the wall 9 of the building in which the kettles are located.

A connecting rod 10 may be pivotally secured at one end, by means of a pin 11, to one end of the reciprocating shaft 7. The other end of the connecting rod 10 is journaled on a crank pin 12, which is carried by a pulley 13. The pulley 13 is journaled on a suitable shaft 14, and is driven by a belt 15. It will, of course, be understood that any other suitable means for imparting reciprocating motion to the horizontal shaft 7 may be employed if desired.

Brackets 16 are secured at suitable locations on the shaft 7, there being one of these brackets provided for each kettle 5. To the outer end of each bracket 16 there is pivotally secured, by means of a pin 17, one end of a bent arm 18. The arm 18, in the normal operative position, extends upwardly from its pivotal connection with the bracket 16, then forwardly, and then downwardly into the kettle 5.

To the outer end of the arm 18, there is secured a paddle 19, the lower edge of which is curved to conform more or less to the curvature of the bottom of the kettle 5.

It will be noted that the arm 18, and its paddle 19, are adapted to be swung upwardly to the position shown in dotted lines in Fig. 3 of the drawings, so that the kettle 5 may be readily removed from its stove when the paddle 19 is thus raised to the inoperative position.

The operation of the device will be readily apparent. The shaft 7 being reciprocated constantly by means of the crank pin 12 and connecting rod 10, such of the paddles 19 as are in the operative position, as shown in full lines in Fig. 3 of the drawings, will be reciprocated within the kettles 5, in a direction parallel to the shaft 7, having a range of movement therein sufficient to scrape away that portion of the material on the bottom of the kettle which is exposed to the direct heat of the stove, thus preventing scorching or burning of the material, which is an important desideratum in the cooking of such materials as candy.

When it is desired to remove one of the kettles from the stove, after the cooking of the material therein has been completed, it is necessary merely to raise the paddle 19 out of the kettle, causing the same, and the arm which carries it, to assume the position shown in dotted lines in Fig. 3, a portion of the arm 18 resting upon the reciprocating shaft 7. The arm 18, when thus raised to the inoperative position, will automatically remain there by gravity.

It will be noted that the paddle 19 may thus be lifted out of the particular kettle which is to be removed from the stove, and left in the inoperative position, without stopping the reciprocation of the shaft 7 or interfering in any way with the operation of any of the paddles in the other kettles. When the kettle is replaced upon the stove, with fresh material therein, it is necessary merely to pull down the paddle 19 to cause the same again to function.

It will be seen that there is thus provided simple and efficient apparatus for preventing scorching of materials being cooked, which is adapted for use in connection with a plurality of kettles, in which the action may be continued in certain of the kettles while the other kettles are removed from their respective stoves.

I claim:

1. Cooking apparatus comprising a plurality of kettles arranged in a row, a paddle normally positioned in each of said kettles and adapted to be reciprocated horizontally therein, means for simultaneously reciprocating said paddles, said paddles being movably connected to the reciprocating means whereby said paddles may be individually withdrawn to inoperative positions.

2. Cooking apparatus comprising a kettle, a reciprocable shaft arranged behind said kettle, means for reciprocating said shaft longitudinally, a bracket carried by said shaft, an arm pivotally connected to said bracket, the front end of said arm extending into the kettle, and a paddle carried at the front end of said arm, said arm being adapted to be swung upon its pivotal connection to and from the operative position and to be maintained automatically in the respective operative and inoperative positions.

3. Cooking apparatus comprising a plurality of kettles arranged in a row, a reciprocable shaft, means for reciprocating said shaft longitudinally, a plurality of brackets carried by said shaft, arms connected to said brackets, one of said arms being provided for each kettle, the end of each of said arms normally extending into a kettle, and a paddle carried at the front of each arm, said arms being separately movable whereby the paddles may be individually positioned in their respective operative and inoperative positions.

4. Cooking apparatus comprising a plurality of kettles arranged in a row, a reciprocable shaft arranged behind said kettles, means for reciprocating said shaft longitudinally, a plurality of brackets carried by said shaft, arms pivotally connected to said brackets, one of said arms being provided for each kettle, the front end of each of said arms extending into a kettle, and a paddle carried at the front end of each arm, said arms being adapted to be separately swung upon their pivotal supports to and from their operative positions and to be maintained automatically in their respective operative and inoperative positions.

In testimony whereof, I have hereunto signed my name.

GAVIN B. YOUNG.